United States Patent [19]

Mann

[11] Patent Number: 5,588,573
[45] Date of Patent: Dec. 31, 1996

[54] LOAD-CARRIER FOR VEHICLES

[75] Inventor: Gerhard Mann, Ulricehamn, Sweden

[73] Assignee: Mont Blanc Industri AB, Dalsjofors, Sweden

[21] Appl. No.: 362,473
[22] PCT Filed: Apr. 26, 1993
[86] PCT No.: PCT/SE93/00361
§ 371 Date: Dec. 20, 1994
§ 102(e) Date: Dec. 20, 1994
[87] PCT Pub. No.: WO94/00315
PCT Pub. Date: Jan. 6, 1994

[30] Foreign Application Priority Data

Jun. 26, 1992 [SE] Sweden ........................ 9201975

[51] Int. Cl.⁶ ............................................. B60R 9/00
[52] U.S. Cl. ........................ 224/329; 224/330; 224/325
[58] Field of Search ........................... 224/329, 330, 224/331, 309, 314, 315, 321, 322, 325, 326, 327, 328

[56] References Cited

U.S. PATENT DOCUMENTS

| 4,684,049 | 8/1987 | Maby et al. | 224/329 |
| 4,757,929 | 7/1988 | Nelson | 224/329 |
| 5,452,831 | 9/1995 | Linnhoff | 224/329 |

FOREIGN PATENT DOCUMENTS

| 0283208 | 9/1988 | European Pat. Off. |
| 0364692 | 4/1990 | European Pat. Off. |
| 3532170 | 3/1987 | Germany |
| 8904776 | 6/1989 | WIPO |
| 9002668 | 3/1990 | WIPO |

Primary Examiner—David J. Walczak
Attorney, Agent, or Firm—Dvorak and Traub

[57] ABSTRACT

The invention concerns a load-carrier for vehicles of the kind comprising a load-carrying tubular rail extending across the vehicle roof in the transverse direction of the vehicle, and a foot member at each lateral edge of the vehicle roof, said foot member resting on the upper vehicle roof face and serving as a load-carrying rail support. The purpose of the invention is to provide a load-carrier which is safely anchored to the vehicle roof also when the latter is not formed with safe support against outwardly directed forces, i.e. drip-mouldings, previously commonly provided on vehicle roofs. In a load-carrier in accordance with the invention a clamping element which from the support on the foot member projects into the interior of the load-carrying rail and which may be clamped against the inner face of said rail, is connected with an actuating member mounted in the foot member, in a motion-transferring fashion, said clamping element comprising a finger-like spring which is connecting with the foot member and one end of which abuts against the inner face of the load-carrying rail, said resilient finger directed obliquely outwards from said end so that in tightened conditions it tends to move the foot member inwards, towards the vehicle center.

20 Claims, 10 Drawing Sheets

LOAD-CARRIER FOR VEHICLES

BACKGROUND OF THE INVENTION

The subject invention concerns a load-carrier for vehicles of the kind comprising a load-carrying tubular rail extending across the vehicle roof in the transverse direction of the vehicle, and a foot member at each lateral edge of the vehicle roof to support said load-carrying tubular rail, said foot member resting on the upper vehicle roof face and serving as a load-carrying rail support.

When load-carriers of the kind outlined above are exposed to heavy stress exerted thereon by the load that they carry, for instance as the vehicle is driven across uneven road surfaces with consequential temporary or permanent deflection of the load-carrying rail extending across the vehicle roof, or as the vehicle is driven through sharp bends, there is an immediate risk, particularly in vehicles of the kind having no drip moulding at the roof edge, that the lower end of the foot member of the load-carrier will tend to move laterally outwards with consequential disengagement of the foot member from the roof edge.

BRIEF SUMMARY OF THE INVENTION

The main purpose of the invention is to eliminate this drawback and to provide a load-carrier structure which positively maintains its secure and safe engagement with the vehicle roof edge, also when exposed to load.

This purpose is achieved in a load-carrier of the kind defined in the appended claims.

BRIEF DESCRIPTION OF THE DRAWINGS

The load-carrier in accordance with the invention will be described in the following with reference to the accompanying drawings, wherein.

DETAILED DESCRIPTION OF THE INVENTION

The load-carrier illustrated in FIGS. 1–7 of the drawings consists of a load-carrying tubular rail 1 which in the mounted position of the load-carrier extends transversely across the vehicle 2 onto which the load-carrier is to be mounted, and a foot member 3 forming a load-carrier bearing means and supported by the vehicle roof adjacent the lateral edge thereof by way of a base 4. Numeral reference 5 in the drawing figures designates an actuating arm which is pivotally mounted in the foot member, said arm serving to secure the foot member to the vehicle roof and also to secure the load-carrier to the foot member.

In accordance with the shown embodiment, the load-supporting rail having a square cross-sectional configuration, is preferably formed at its lower end with centrally located slits 6 which are open towards the rail ends and which from the rail ends extend some distance towards the vehicle center. The foot member 3 illustrated in the drawings consists of sheet metal bent to a U-shape as most clearly apparent from FIG. 5. The lateral flanges or legs of the foot member are designated by numeral 3a and the web portion thereof by 3b. The upper part of the web 3b is bent downwards so as to form an essentially horizontally extending tongue 7 serving as a° rail support whereas the lateral flanges 3a project upwards on either side of the rail to form lateral rail support means. Adjacent its free end the support tongue is formed with lugs 8 depending from the tongue sides and provided with oval apertures 9. Through each one of said oval apertures 9 extends a pin 10 which is secured in the lateral flange of the foot member. In the normal position illustrated, the pin 10 abuts against the lower edge of the aperture 9, thus preventing further deflection upwards of the tongue 7 whereas the pins allow limited deflection of said means downwards until the pins abut against the upper end edges of the apertures. In the neighborhood of the point 11 where the tongue merges into the web portion 3b, a pin 12 projects through the tongue. Said pin 12 is mounted in said tongue 7 so as to be vertically displaceable, in accordance with the embodiment shown inside a bushing 13 of a low-friction wear-resistant material. Reference numeral 15 designates a suspension piece having a portion 15a extending in parallel with the tongue and like said tongue, said portion is passed through by the pin 12. The downwardly directed head 14 of the pin forms an abutment surface abutting against the lower face of the portion 15a in which area it is engaged from below by a leaf spring 23 tending to urge the pin downwards. At its upper end the pin is formed with a groove 16 passing through the outer end portion of a rocker arm 17 disposed in the interior of the tubular rail and, by means of an embossment 18 on the outer face, it is riveted to said rocker means and it clamps in position a resilient finger 19, the latter forming a resilient finger means in abutment against the upper inner face 20 of the tubular rail and extending obliquely upwards and outwards away from the rocker means 17. Numeral reference 21 designates a bolt which while extending inside a bushing 22 passes through the tongue 7 and the suspension piece 15 and which by means of a groove 24 formed adjacent its upper end extends through the inner end portion of the rocker means 17. On the upper face of the latter the rivet bolt is secured by upsetting 25. The head 26 of the rivet 21 abuts against the lower face of the support 7, 15a of the load-carrying rail 1 and maintains the inner end of the rocker means 17 at a distance above the support 7, 15a that corresponds to or only slightly exceeds the lower tube rail thickness, whereby as the rocker means rocks counter-clockwise in accordance with the drawings about the bolt 21 the load-carrying rail may be displaced lengthwise with respect to the foot member 3 whereas upon clockwise rocking movement of the rocker means the rocker means end portion 17a extending above the bolt 21 immobilizes the tube rail by pinching it against the support while at the same time the resilient finger 19 is pressed against the upper inner face of the tube rail.

Figure 1:
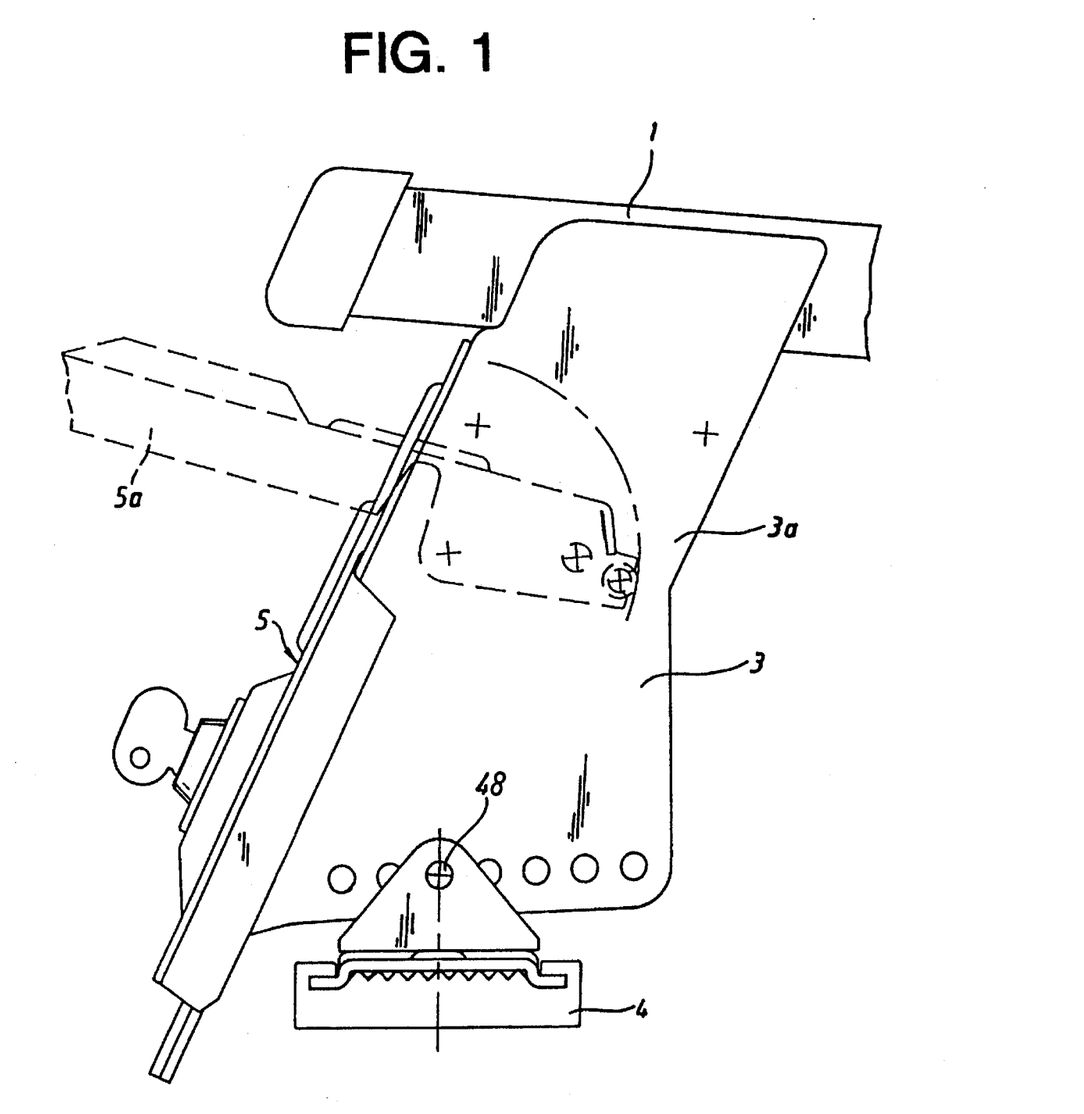
FIG. 1 is a lateral view of one end portion of a load-carrier in accordance with a first embodiment of the invention as seen in the longitudinal direction of the vehicle.
Figure 2:
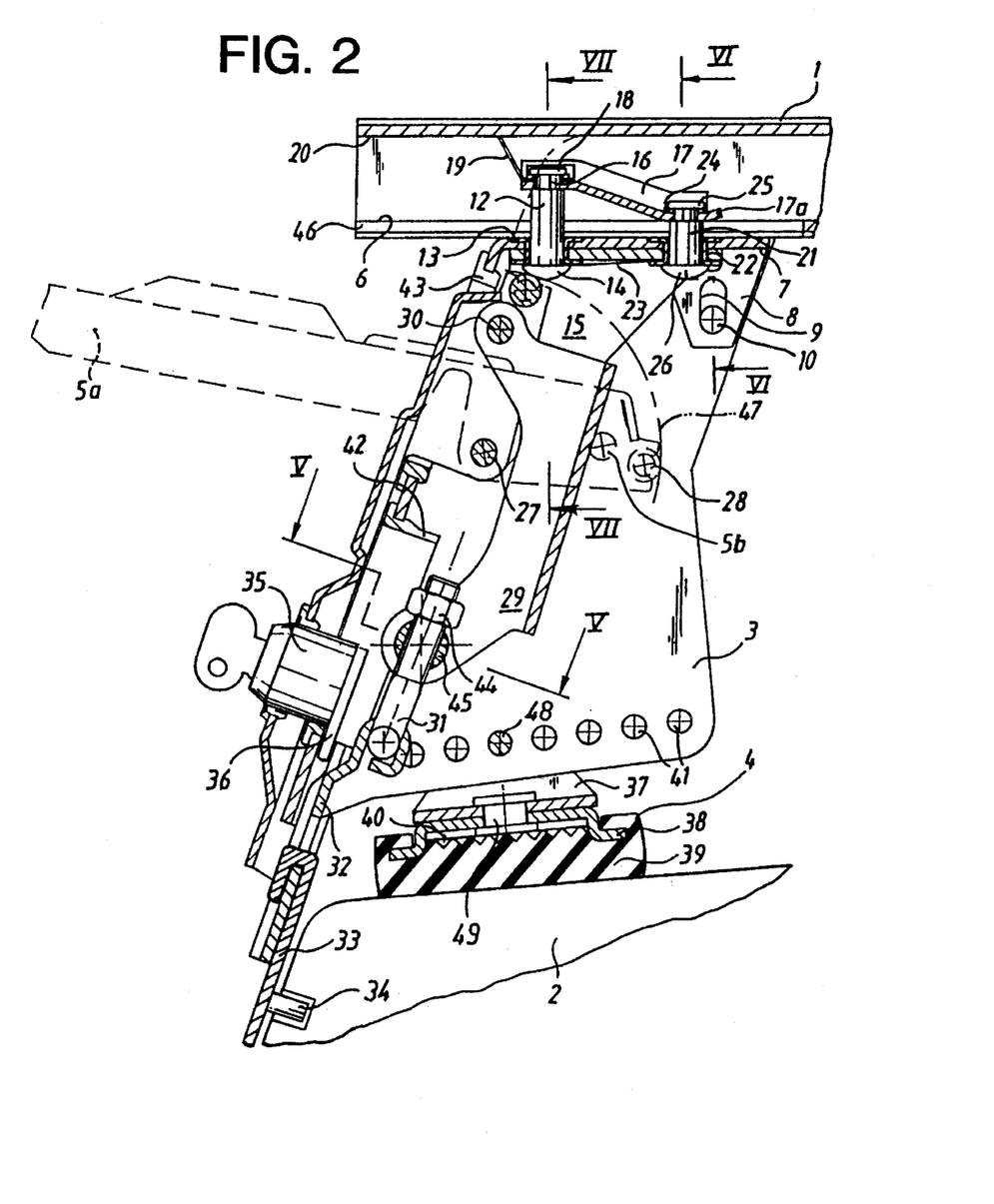
FIG. 2 is a sectional view through the load-carrier of FIG. 1.
Figure 3:
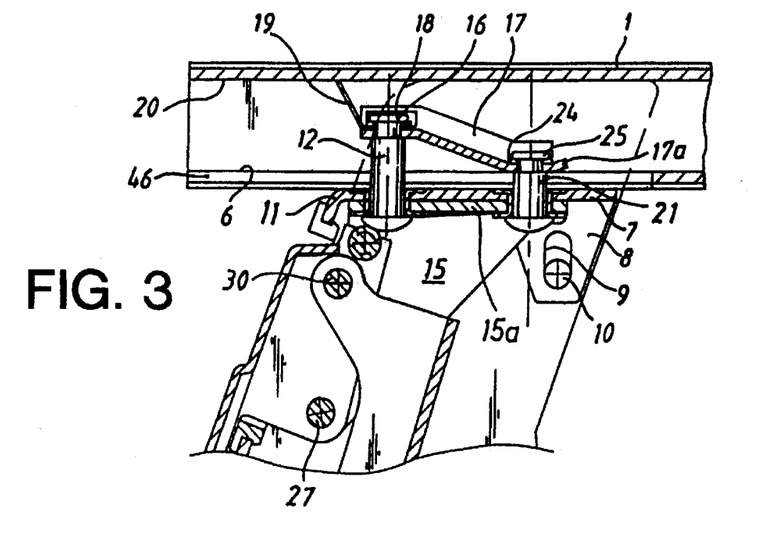
FIG. 3 is a sectional view corresponding to FIG. 2 but showing the upper portion of the load-carrier in the position when secured to the vehicle, i.e. corresponding to the situation illustrated in FIGS. 1 and 2.
Figure 4:
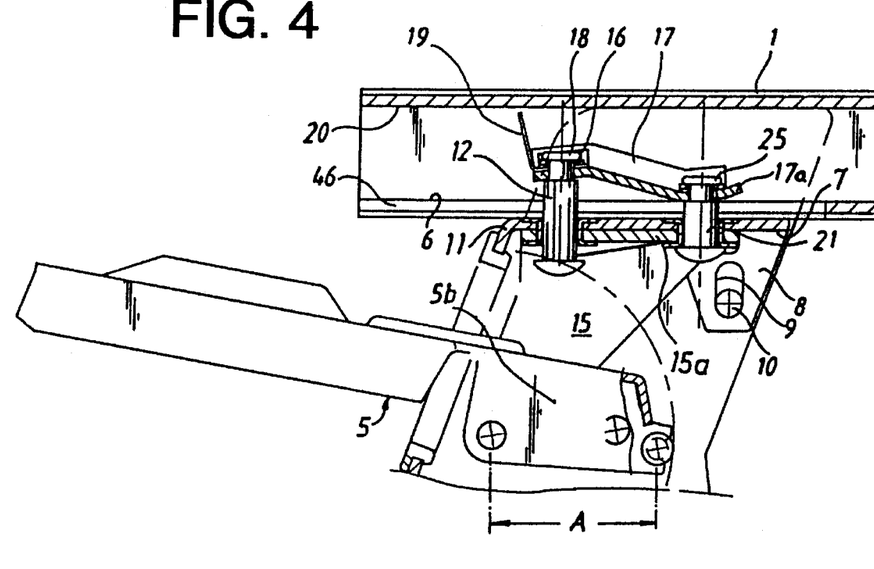
FIG. 4 is a sectional view corresponding to FIG. 3 and showing the same load-carrier portion in the position of detachment of the latter.
Figure 5:
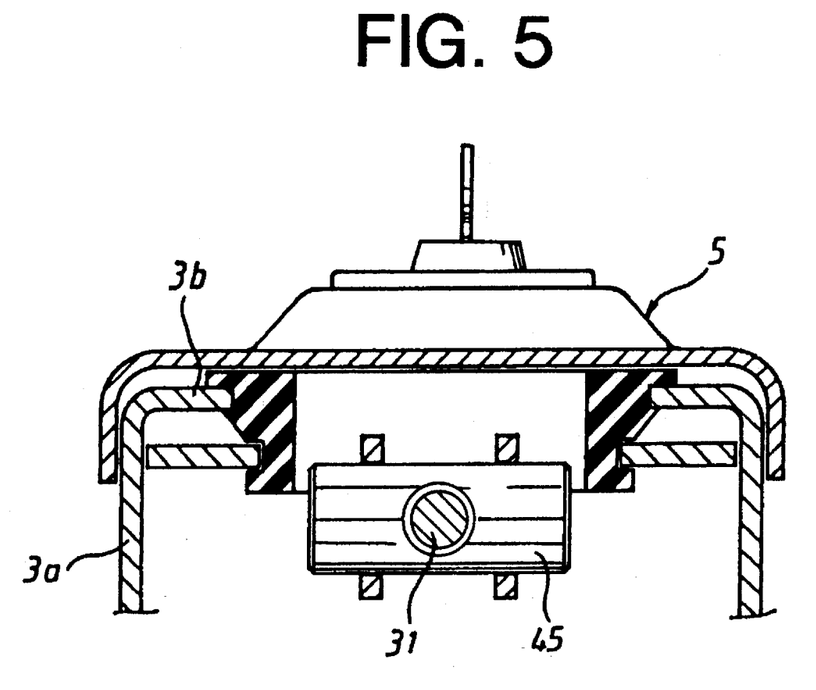
FIG. 5 is a cross section along line V—V of FIG. 2.
Figure 6:
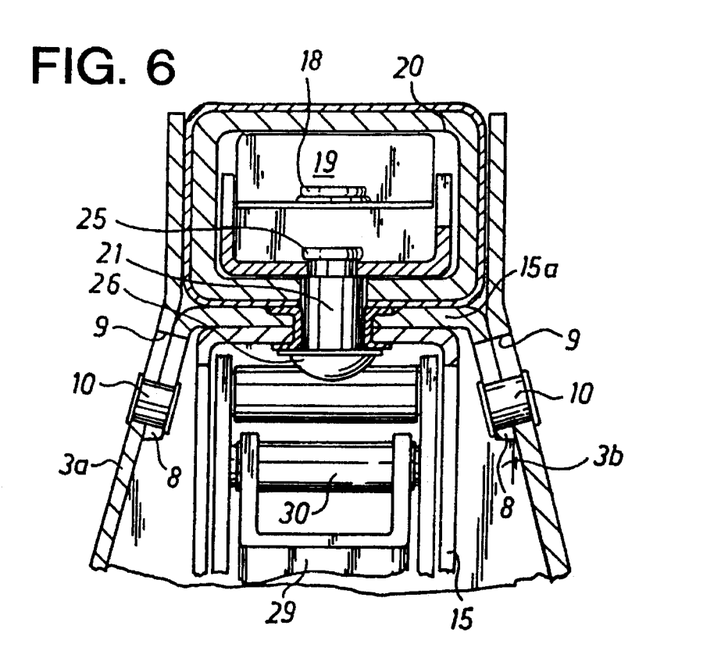
FIG. 6 is a section along line VI—VI of FIG. 2.
Figure 7:
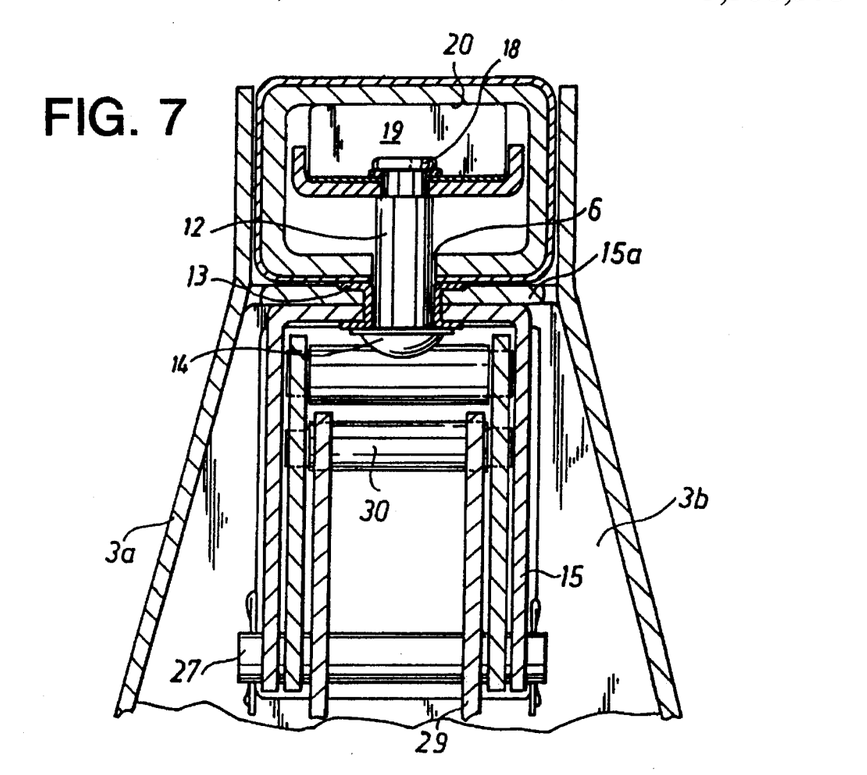
FIG. 7 is a corresponding section along line VII—VII of FIG. 2.
Figure 8:
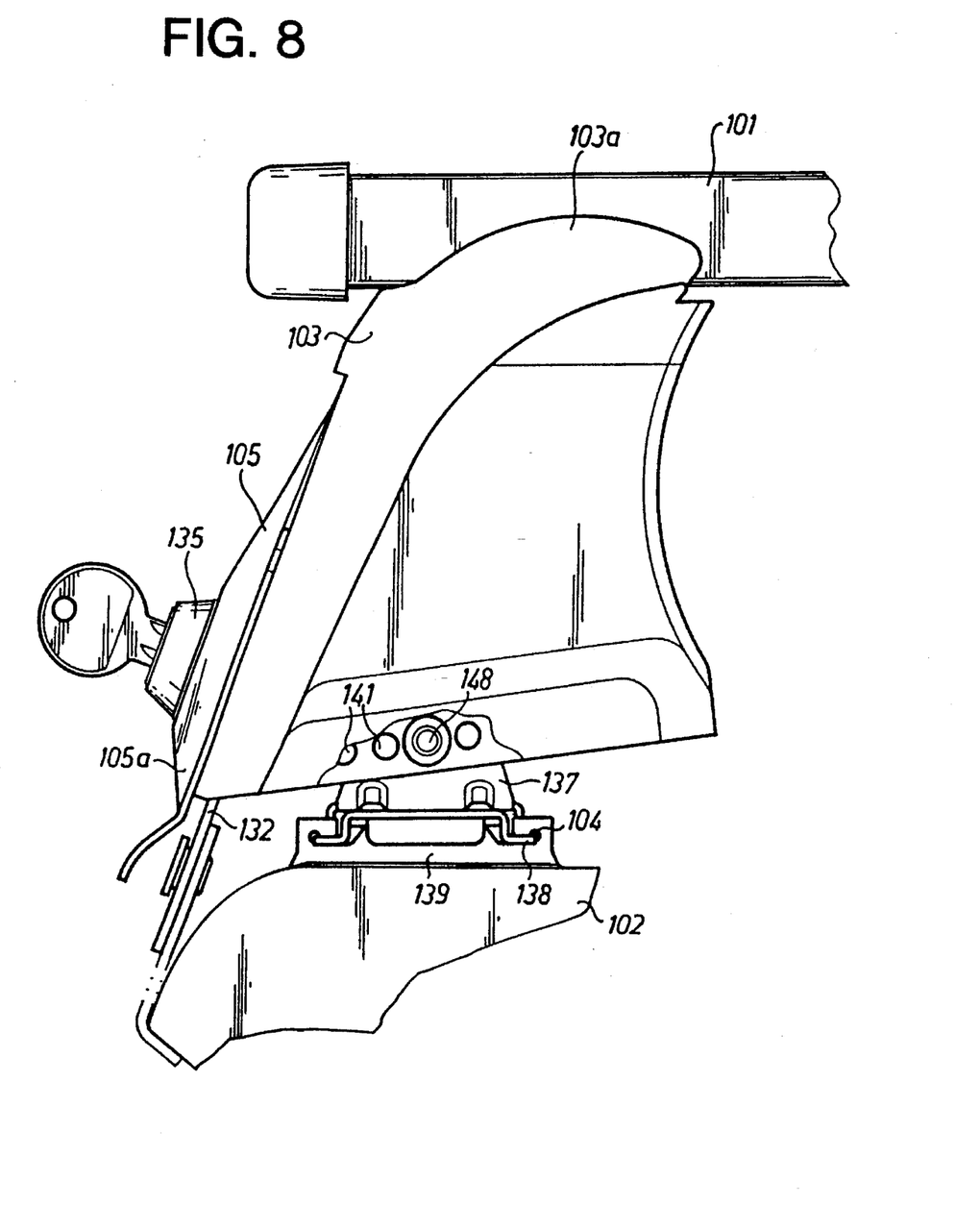
FIG. 8 is a lateral view of one end portion of a load-carrier according to a second embodiment of the invention, the load-carrier being shown in a fastened position and the view being taken in the longitudinal direction of the associated vehicle.
Figure 9:
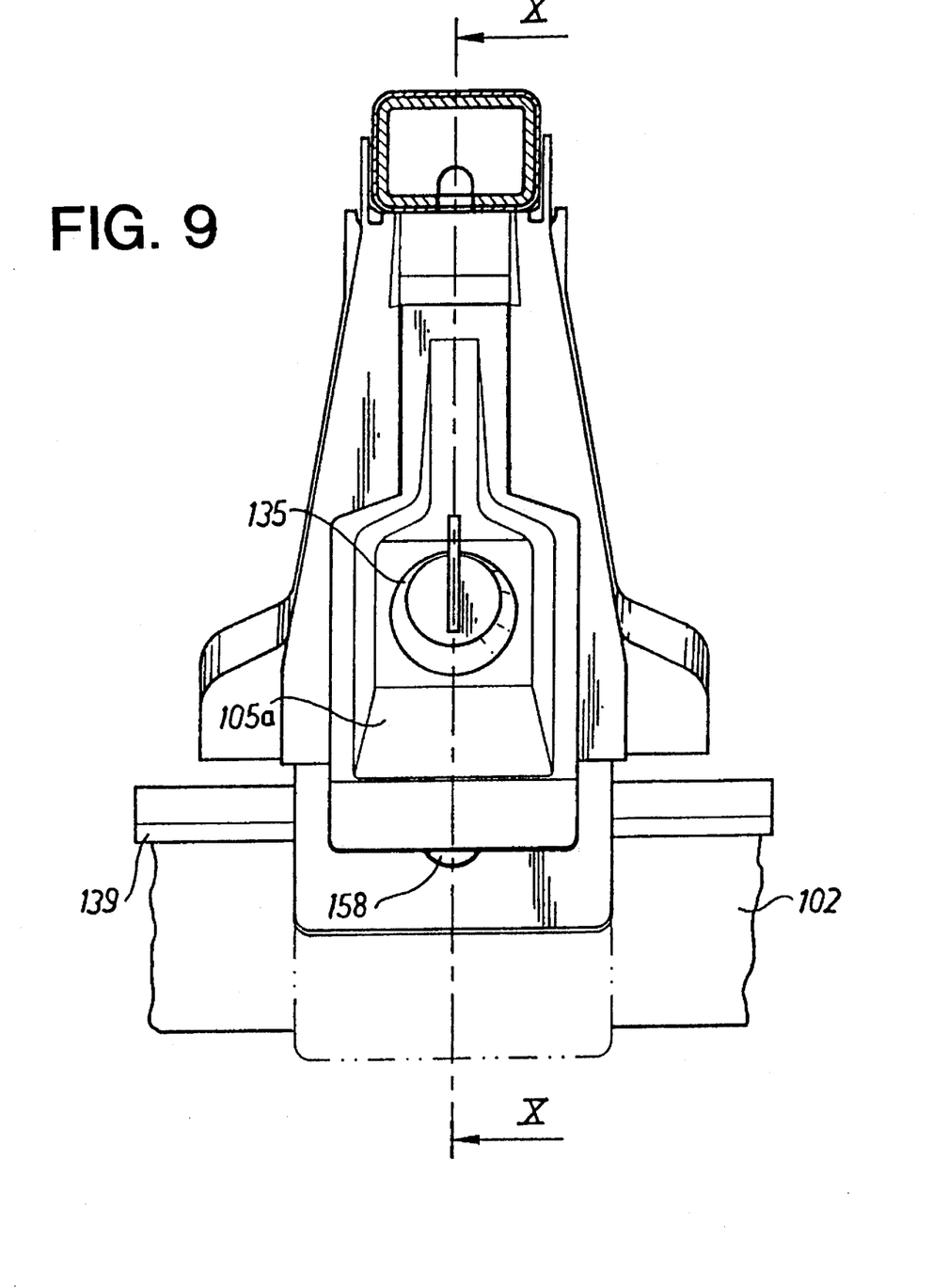
FIG. 9 is a view as seen from the left in FIG. 8.

The actuating arm 5 is arranged as a double-arm lever the fulcrum 27 of which is formed by a pivot pin which is fixed with respect to the foot member 3 and one arm 5a of which projecting laterally from one side of the fulcrum 27 forms a handle while the other arm 5b projecting laterally from the other side of the fulcrum 27 supports a pressure-exerting means 28 which in accordance with the shown embodiment consists of a roller spaced such a distance A from the fulcrum 27 that as the handle 5a is pivoted downwards from the position illustrated in FIG. 4 to the securing or fastened position illustrated in FIG. 3 it is forced to pass the bolt head 14 which serves as a counter-abutment means, and preferably beyond the center of the bolt in order to create an over-center effect resulting in a secure anchoring (of the arm) in this position. Reference numeral 29 designates a traction link which is interconnected with the actuating arm 5 via the fulcrum 27 by means of a pivot pin 30, and via an adjustable traction pin 31 it is connected at its lower end with a runner 32, the latter in turn supporting a connection means 33 which is designed to grip the roof edge of the associated vehicle. This traction means could be configured in various ways depending on the configuration of the vehicle roof edge. In a hook-like fashion, the connection means 33 engages the runner 32 and it is replaceable for adaptation to the associated vehicle. The connection means illustrated in the drawings is provided with a projecting pin 34 intended for engagement with apertures or depressions formed in the roof edge but the connection means could equally well be shaped as a hook for gripping engagement with the roof gripping edge when such is provided. Also other configurations matching the shape and construction of the vehicle roof edge are possible. In order to lock the actuating arm 5 in the fastening position, it may be provided with a lock 35 formed with a projection 36 that in a predetermined angular position of the lock engages the foot member, thus preventing unauthorized pivotal movement outwards of the actuating arm and as a result thereof detachment of the load-carrier. Numeral reference 37 designates a fitting which via a base plate 38 supports a protective pad 39 of rubber or some other suitable soft material. In accordance with the embodiment shown, the protective pad which could be made from a comparatively firm material, is formed on its upper face with rail-like protruding ribs and intermediate grooves 40 imparting some resiliency to the protective pad so that it may move relatively to the base plate 38 and in this manner take on a shape in conformity with the profile of the vehicle roof. In addition, the base plate is rotational horizontally with respect to the fitting 37 as a result of its connection therewith via the rivet 49. Obviously, the protective pad could be designed in a different manner, for instance with interior voids allowing the pad to adapt itself easily to the shape of the vehicle roof profile. The position of the fitting 37 on the foot member as seen in the transverse direction of the vehicle could be varied by shifting the fastening peg 48 or similar element by means of which it is secured to the foot member to the desired mounting hole 41. In accordance with the shown embodiment, the actuating arm 5 as well as the traction link are in the form of U-shaped profile members having such a leg spacing that they could be nested one in the other and consequently provide excellent stability to the articulated Joint interconnecting the lateral legs of said parts. The pivot pin 27 is provided in the corresponding lateral flanges or legs of the suspension piece 15. Numeral references 42 and 43 designate edge facings, preferably made from plastics, positioned in corresponding through-holes in the web portion 3b of the foot member, edge facing 42 additionally serving to guide the runner 32.

Fastening of the load-carrier described in the aforegoing to a vehicle preferably is effected in the following manner:

A base element 4 of a design adapted to the roof profile of the vehicle is selected and attached to the foot member 3 in a suitable location as seen in the transverse direction of the vehicle, by selection of a suitable mounting hole 41, and a suitable connection means 33 is hooked onto the runner 32. The foot member with the load-carrying tubular rail mounted thereon is then placed on the vehicle roof with the actuating arm 5 assuming the unfastening position illustrated in FIG. 4. If required, the traction pin 31 is adjusted with the aid of the nut 44. When the actuating arm 5 is pivoted downwards the base element 4 thus will be pressed against the vehicle roof while the runner 32 draws the connection means 33 upwards, thus attaching the foot member 3 to the vehicle roof. Preferably the point of attachment of the traction pin 31 to the runner 32 is positioned such that a straight line from said point and the pivot pin 30 passes the fulcrum or pivot pin 27, when the actuating arm 5 is pivoted downwards, whereby consequently an over-center locking position is created. When the actuating arm 5 is pivoted downwards the abutment means 28 simultaneously moves upwards, along the curve 47, forcing the bolt 12 upwards by acting on the bolt head 14 in such a manner that the rocker means 17 is rocked in the clockwise direction as seen in the drawings, the resilient finger means 19 consequently being moved into abutment against the inner upper face 20 of the load-carrying rail and its inner end pinching, through lever action, the tubular rail against the foot member support 7. Because the resilient finger 19 is directed obliquely outwards and upwards, it tends to move the foot member inwards, towards the vehicle center, in the fastened position. Should the load-carrying tubular rail be deflected downwards at its center as a result of excess load on the rail, the foot member will not be exposed to any moment tending to move its lower end away from the roof edge and out of engagement with the latter, because the tongue 7 forms a plane with possibility to deflect with respect to the rest of the foot member. This ability of the foot member support to deflect attributes to anchoring the foot member in secure engagement with the roof edge, also under heavy load conditions. The abutment of the rocker means 17 against the inner lower face by means of its inner end provides a lower pressure point, and the abutment of the resilient tongue against the upper inner face of the tubular rail provides an upper pressure point which thus is exposed to an expander-like force as the actuating arm is pivoted to its locking position. The clamping element thus formed by the rocker means 17 and the associated pins 12 and 21 and the resilient finger 19 thus ensure secure and positive anchoring of the load-carrying rail while at the same time the positions of the pressure points, distributed in the lengthwise direction of the rail, provides a highly favorable moment relationship between the rail and the foot member. The spring 23 tends to move the clamping means to its release position as soon as the actuating arm has been pivoted to its upper position, which means that in this position the foot member could conveniently be set in the desired position by being displaced along the load-carrying rail with the pins 12, 21 being moved along slit-shaped apertures 46 formed in the lower wall of the rail.

The load-carrier illustrated in FIGS. 8–12 in the drawing figures consists of a load-carrying tubular rail 101 which in the mounted position of the load-carrier extends across the vehicle 102 on which the load-carrier is to be mounted, and a foot member 103 which forms a load-carrier support which via a base 104 rests on the vehicle roof adjacent the lateral edge thereof. Numeral reference 105 designates an actuating arm, said arm serving to anchor the foot member in safe engagement with the vehicle roof and and also to anchor the load-carrier 101 safely to the foot member, all these arrangements being similar to those of the previous embodiment.

The load-carrying tubular rail which also in accordance with this embodiment has a square cross-sectional configuration, is preferably formed at its lower end with centrally located slits 106 which are open towards the rail ends and which from the rail ends extend some distance towards the vehicle center. The foot member 103 illustrated in the drawings consists, like in accordance with the previous embodiment, of sheet metal bent to a U-shape. The lateral flanges or legs of the foot member are designated by 103a and its web portion by 103b. Like in the previous embodiment the upper part of the web 103b is bent downwards so as to form an essentially horizontally extending tongue 107 serving as a rail support whereas the lateral flanges 103a project upwards on either side of the rail to form lateral rail supports. Adjacent its free end, the support tongue 107 is supported by a transverse pin 110 which in accordance with the example shown is enclosed at its upper part by the support tongue 107 whereas its lower part is enclosed by an upper flange-forming part 151a bent horizontally outwards from an otherwise vertical plate-like arm 151. The flange 151a is connected to the tongue 107 by means of connectors, such as e.g. rivets 152, 153. When the orientation of the pin 110 relatively to the foot member lateral flanges 103b is stable the pin will form a local support means to support the load-carrying rail 101 upon deflection downwards of the central part of the rail 101, with the result that said rail may pivot about said pin against the action of the end portion 119 of the clamping elements.

The pin 110 could also be arranged so as to be vertically movable relatively to the foot member lateral flanges 103a between abutment faces on the latter, not shown, in order to allow limited vertical movement relatively to the rest of the foot member in a manner in principle identical to that in accordance with the previous embodiment. In the latter case, the pin 110, in the normal position as illustrated, preferably abuts against a lower abutment means, thus preventing further deflection upwards of the tongue 107 whereas restricted turning movement downwards of the pin 110 is possible relatively to the rest of the foot member until the pin 110 moves into abutment against lower abutment means.

A depending traction link 154 passes through the tongue 107. This traction link is arranged to be vertically displaceable relatively to the tongue 107. Said traction link 154 additionally passes through a spring leaf 117, 119 forming a clamping means which upon the movement downwards of the traction link presses against the inner face of the tubular rail. The left end portion 119 of the clamping means according to FIGS. 10 and 12 form a finger-like spring which is directed downwards and outwards as calculated from the vehicle center. This direction is obtained in accordance with the shown example by designing the clamping means as an arch with the inwardly directed curve of the arch facing away from the inner face of the rail. By means of an abutment face the right-hand portion 117 of the clamping means engages an abutment tongue 155, the latter projecting upwards through the slit 106 in the rail. Preferably, the portion 117 is supported by the abutment tongue 155 in such a manner as to ensure that it does not have a frictional effect on the inner face of the rail. In case said portion 117 abuts against said inner face, the abutting part thereof may be sufficiently rounded to ensure that-the friction is reduced to a minimum. The spring finger 119, on the other hand, abuts against the load-carrying rail with a high frictional force in the tightened condition. In accordance with the embodiment illustrated this high frictional force is obtained in that the finger engages the rail by means of its tip. At its top, the traction link is formed with an abutment means 156, in the example illustrated a nut which is screwed into the upper end portion of the traction link and consequently the position of the abutment means could be adjusted relatively to the clamping means. A horizontal pivot pin 154a interconnects the traction link 154 with yet another link part 157.

The actuating arm 105 is arranged as a two-arm lever the fulcrum 127 of which is formed by a pivot pin which is fixed with respect to the foot member 103. One arm 105a of the lever projecting laterally from one side of the fulcrum 127 forms a handle and on the same side of the pivot pin 127 as the handle via the arm 105a is articulated to the lower end portion of the link part 157 via a pivot pin 128. Numeral reference 129 designates a traction link which by means of a pivot pin 130 is interconnected at its upper end with the actuating arm portion 105b and which at its lower end is connected with a runner 132 via an adjustable traction pin 131. The runner 132 in turn supports a connection means 133 secured to the runner 132 by means of a rivet 158 which in accordance with the embodiment illustrated is mounted in the runner 132 in a vertically oval-shaped hole 159, thus providing a possibility for restricted displacement vertically of the connection means 133. The connection means 133 preferably is detachable from the runner and also replaceable for the purpose of adaptation to the associated vehicle. The replacement feature preferably is obtained by arranging the head of the rivet 158 in such a manner that it may be pulled through the hole 159 in a position of displacement in which the rivet 158 is lifted relatively to the runner 132. For example, a connection means of the same kind as in the previous embodiment incorporating projecting pins could thus be added if required for attachment on the vehicle. Obviously, any other connection means adapted to the vehicle on which the load-carrier is to be used, could be joined to the remaining part, as also mentioned in connection with the description of the previous embodiment. In order to lock the actuating arm 105 in the fastening position, it may be provided with a lock 135 formed with a projection 136 which in a predetermined angular position of the lock engages the foot member, thus preventing unauthorized pivotal movement outwards of the actuating arm and as a result thereof detachment of the load-carrier. Numeral reference 137 designates a fitting which via a base plate 138 supports a protective pad 139 of rubber or some other suitable soft material. In accordance with the embodiment shown, the protective pad, which could be made from a comparatively firm material, is formed on its upper face with rail-like protruding ribs and intermediate grooves 140 imparting some resiliency to the protective pad so that it may move relatively to the base plate 138 and in this manner take on a shape in conformity with the profile of the vehicle roof. In addition, the base plate is arranged for turning movements horizontally with respect to the fitting 137 as a result of its connection therewith via the rivet 149. Obviously, the protective pad could be designed in a different manner, for instance with interior voids allowing the pad to adapt itself easily to the shape of the vehicle roof profile. The position of the fitting 137 on the foot member, as seen in the transverse direction of the vehicle, could be varied by shifting the fastening peg 148 or similar element by means of which it is secured to the foot member, to the desired mounting hole 141. In accordance with the shown embodiment, the actuating arm 105 as well as the traction link are designed at least partly as U-shaped profile members the leg spacing of which is such that the members may be nested one in the other and thus provide excellent stability to the articulated joint interconnecting the lateral flanges or legs of said parts. The pivot pin 127 is provided in the corresponding lateral flanges or legs of the arm 151 which thus forms a suspension piece. At its top, the pin 131 is provided with a nut 144 which is threaded onto the pin, thus allowing adjustment of the degree of abutment of the pin 131 against the abutment face formed by a pin 145 on the traction link 129.

Figure 10:
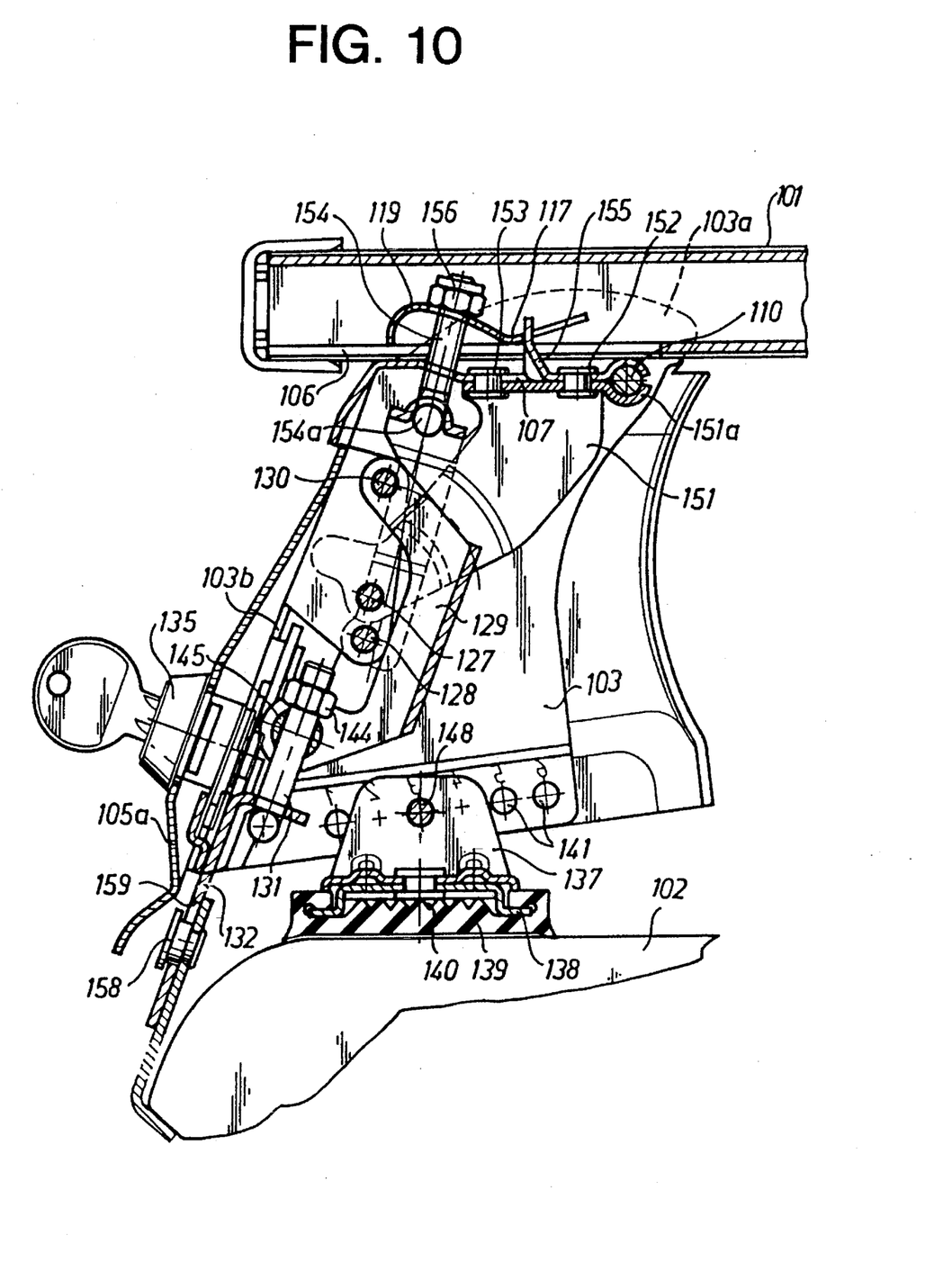
FIG. 10 is a section along line X—X in FIG. 9.
Figure 11:
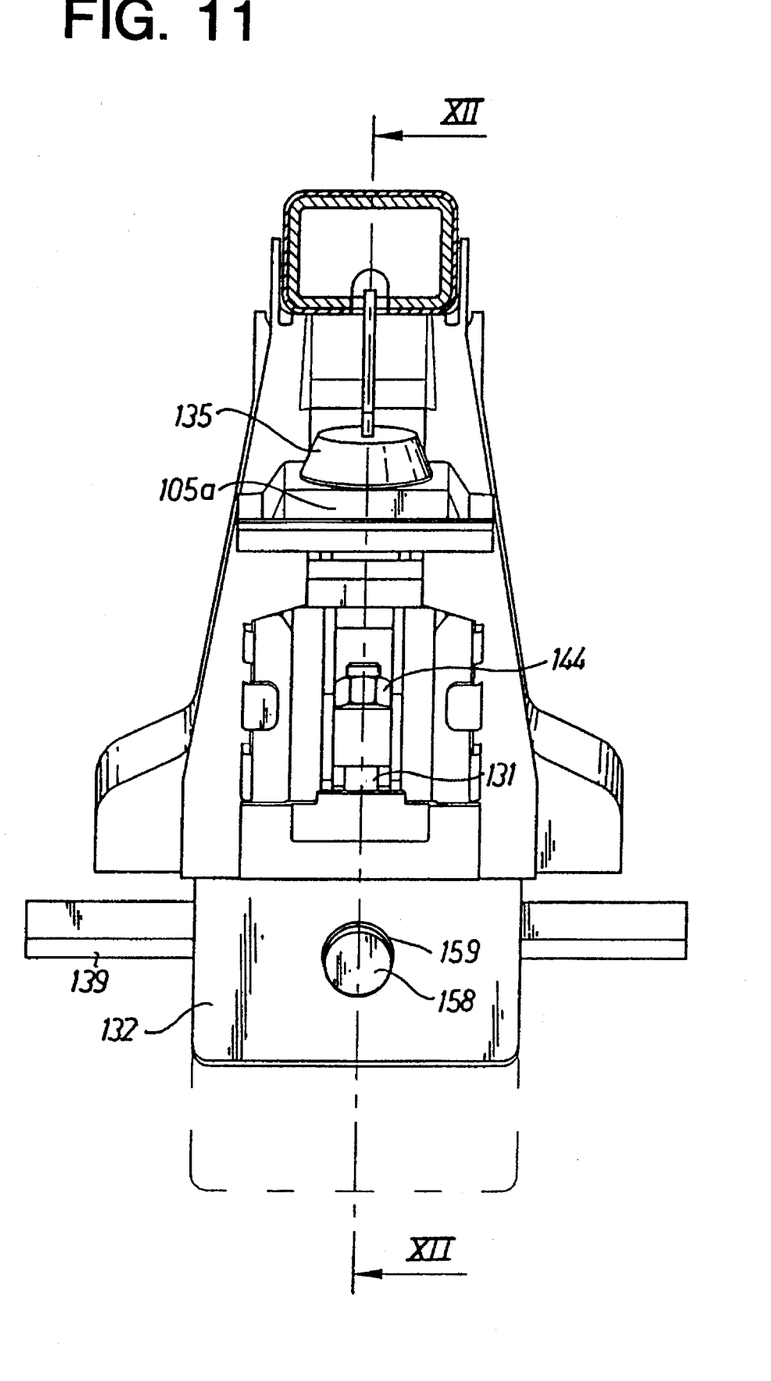
FIG. 11 is a view corresponding to FIG. 9 but showing the load-carrier in a detached position.
Figure 12:
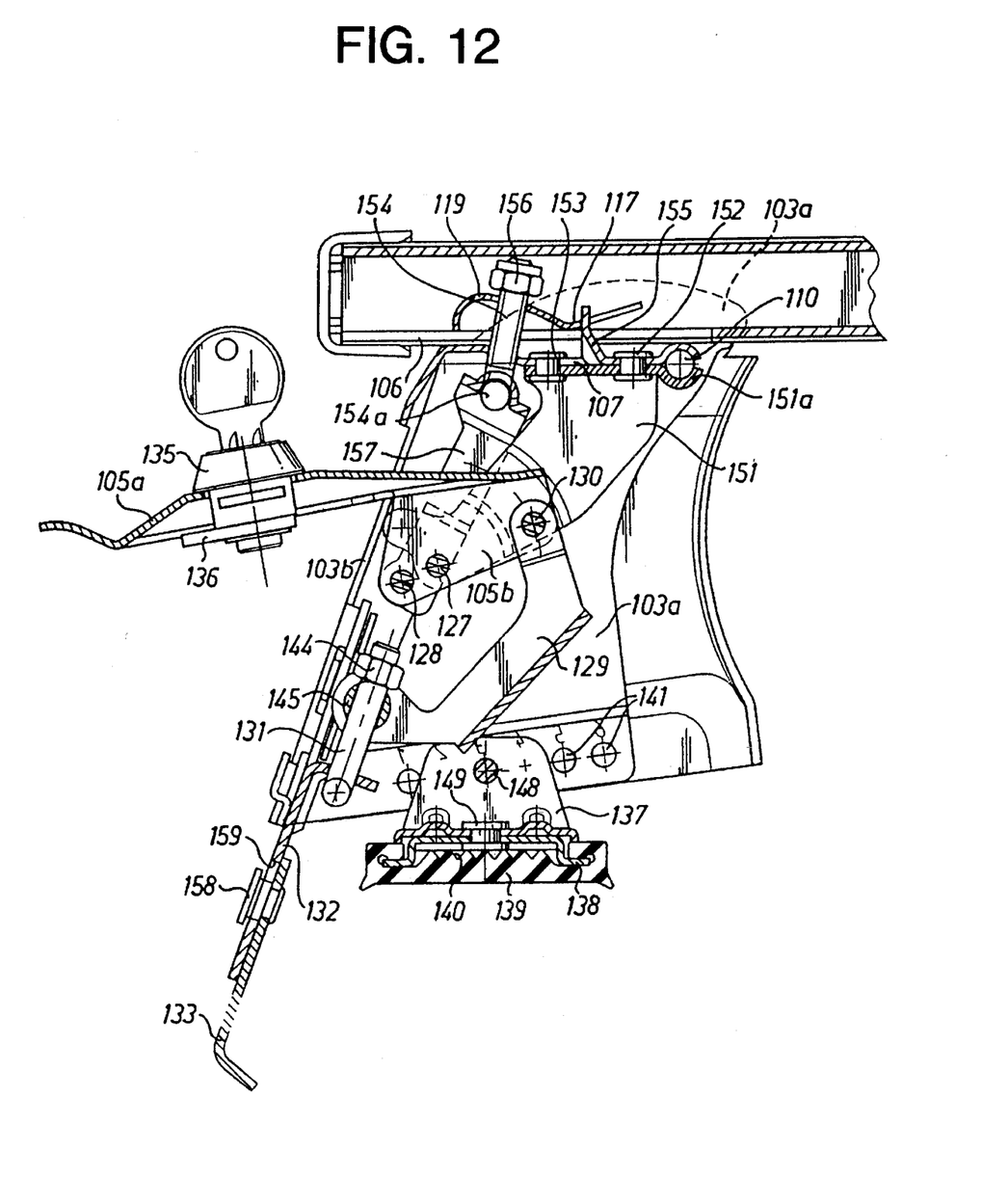
FIG. 12 is a section along line XII—XII of FIG. 11.

Fastening of the load-carrier just described to a vehicle preferably is effected in the following manner:

A base element 104 of a design adapted to the roof profile of the vehicle is selected and attached to the foot member 103 in a suitable location as seen in the transverse direction of the vehicle, by selection of a suitable mounting hole 141 and a suitable connection means 33 is hooked onto the runner 132. The foot member with the load-carrying tubular rail mounted thereon is then placed on the vehicle roof with the actuating arm 105 in the unfastening position illustrated in FIG. 12. If required, the traction pin 131 is adjusted with the aid of the nut 144. When the actuating arm 105 is pivoted downwards, the base element 104 thus will be pressed against the vehicle roof while the runner 132 draws the connection means 133 upwards, thus attaching the foot member 103 to the vehicle roof. Preferably, the point of attachment of the traction pin 131 to the runner 132 is positioned such that a straight line from said point and the pivot pin passes the fulcrum or pivot pin 127, when the actuating arm 105 is pivoted downwards, whereby consequently an over-center locking position is created. When the actuating arm 105 is pivoted downwards, the link part 157 and the traction link 154 simultaneously move downwards and the abutment face formed by the nut 156 urges the clamping element 117, 119 downwards, thus tending to flatten the arch-shape of this element. As a result, the resilient finger 119 engages the inner face of the rail and consequently the entire clamping element has a tendency to prolongation to the right as seen in FIGS. 10 and 12. Because the clamping element part 117 abuts against the projecting abutment tongue 155, the clamping element tends to displace the abutment tongue, and thus the entire foot member 103, to the right, i.e. in the direction towards the center of the vehicle. Should the load-carrying tubular rail be deflected downwards at its center as a result of excess load on the rail, the foot member will not be exposed to any moment tending to move its lower end away from the roof edge and out of engagement with the latter. When the tongue 107 forms a plane that may perform rocking movements relatively to the rest of the foot member, this ability of the foot member support means to perform rocking movements attributes to anchoring the foot member in secure engagement with the roof edge, also under heavy load conditions. Otherwise, the yieldable quality of the resilient finger 119 allows the rail to turn about the pin 110. The clamping element thus ensures secure and positive anchoring of the load-carrying rail while at the same time it provides a highly favorable moment relationship between the rail and the foot member. Preferably, the positions of the abutment 156 and of the pivot pin 128 are chosen in such a manner that a straight line between these means passes the pivot pin 127 immediately before the actuating arm 105 reaches its fastening position, i.e. the position illustrated in FIGS. 8 and 10, and consequently also in this case an over-center effect is created and therefore the locked position is safely maintained, also in case the lock 135 is not operative or also in the event such a lock is missing.

The invention is not limited to the embodiments described in the aforegoing and illustrated in the drawings by way of example only, but could be varied as to its details within the scope of the appended claims without departure from the inventive idea.

Although it has proved to be advantageous to arrange for the fulcrum 27; 127 to be stationary relatively to the body of the foot member 3; 103 with the result that the clamping of the foot member against the roof edge is effected independently of the clamping of said member against the load-carrying rail and that adjustment may be made separately for adaptation to the forces required for the respective function, there is nothing to prevent application of the invention also in a situation when the pivot pin 27; 127 is vertically movable, as the case is in the many prior-art constructions. As mentioned previously, the disadvantage with this arrangement is the difficulty of individual adjustment of the securing forces.

In case the load-carrying rail is exposed to heavy deflection forces the support means tongue will move downwards, until the pins 10, or as the case maybe the pin 110, abut(s) against abutment means formed on the stationary part of the foot. These abutment means eliminate the risk that the foot members bend in a non-desirable manner relatively to the load-carrying rail at the occurrence of heavy lateral loads. Preferably, the positions of the abutment means relatively to the pins 10, or as the case may be the pin 110, are adapted in such a manner that the pins abut against the lower abutment faces, when the load-carrier assumes its normal position. In this manner largely every tendency of deflection or bending outwards during conditions of heavy lateral load, such as is the case when the vehicle is driven through sharp curves, is eliminated, because the support is in a position of abutment from the start and consequently cannot deflect or be bent downwards in the foot member that is positioned furthest to the rear as seen in the direction of the forces involved, i.e. furthest outwards in the curve.

I claim:

1. A load-carrier having a load-carrying tubular rail and adapted to extend across a vehicle roof in a transverse direction of a vehicle, a foot member positionable at each lateral edge of the vehicle roof to support the load-carrying tubular rail, the foot member adapted to rest on an upper vehicle roof face comprising: a clamping element projecting into an interior of the load-carrying rail from a support on the foot member, the clamping element, which is arranged to be clamped against an inner face of the rail, being connected in a motion-transferring fashion to an actuating member mounted in the foot member, the clamping element comprising a resilient finger having a first and second end, the first end connected to the foot member and the second end of which acts in abutment against the inner face of the load-carrying rail, the resilient finger being directed obliquely outwards in a direction towards said abutting end such that in a tightened position through a lever action said resilient finger tends to displace an upper portion of the foot member inwards, towards a vehicle center.

2. The load-carrier according to claim 1, wherein the clamping element is arranged to expand vertically.

3. The load-carrier according to claim 2, wherein the clamping element further comprises a first abutment means, said means extending from the foot member through a downwardly facing opening in the shape of a longitudinal slit, formed in said load-carrying rail and projecting laterally above said opening on the inner face of the load-carrying rail, and a second abutment means extending through the opening in the load-carrying rail down into the foot member, the second abutment means being vertically movable and arranged to be shifted to a position corresponding to the expanded condition of the clamping means upon operation of said actuating member in the foot member.

4. The load-carrier according to claim 3, wherein the actuating member further comprises: a third abutment means arranged on an arm which is pivotally mounted in the foot member, and the second abutment means has a counter-abutment means cooperative with the third abutment means.

5. The load-carrier according to claim 4, wherein the support on the foot member carrying the rail is arranged to deflect along a vertical plane passing through the rail when the rail is clamped to the foot member.

6. The load-carrier according to claim 4, wherein the pivotable arm is adapted to effect securement of said foot member to the vehicle roof.

7. The load-carrier according to claim 6, wherein the abutment means of the pivotable arm and the counter-abutment means further comprise rounded abutment ends and are positioned so that they pass their highest points of abutment as the pivotable arm moves towards its securing position, for the purpose of forming an over-center type of locking.

8. The load-carrier according to claim 6, wherein the supports face on the foot member carrying the rail is arranged to deflect along a vertical plane passing through the rail when the rail is clamped to the foot member.

9. The load-carrier according to claim 4, wherein the clamping element further comprises: a rocker means positioned in the interior of the load-carrying rail the rocker means having, a first and a second end, a lower pressure point at the first end supported adjacent a lower inner face of the load-carrying rail by a pin mounted in the foot member, and an upper pressure point at the second end supported adjacent an upper inner face of the load-carrying rail by an upper pressure point pin, the upper pressure point pin passing through the foot member support portion so as to be vertically displaceable therein and forming the counter-abutment means at its lower end.

10. The load-carrier according to claim 9, wherein the support on the foot member carrying the rail is arranged to deflect along a vertical plane passing through the rail when the rail is clamped to the foot member.

11. The load-carrier according to claim 9, wherein the upper pressure point is positioned closest to an outer end of the load-carrying rail and the rocker means is provided close to the upper pressure point with a resilient finger directed obliquely outwards and upwards, the resilient finger intended to engage the inner face of the load-carrying rail upon movement upwards of the upper pressure point.

12. The load-carrier according to claim 11, wherein the lower pressure point of the rocker means is spaced from the support of the foot member by a distance at least corresponding to the thickness of a wall of the load-carrying rail and so devised that upon rocking movements towards the expanding position said distance is reduced and a lower wall of the load-carrying rail is clamped against the foot member support.

13. The load-carrier according to claim 9, wherein the lower pressure point of the rocker means is spaced from the support of the foot member by a distance at least corresponding to the thickness of a wall of the load-carrying rail and so devised that upon rocking movements towards the expanding position said distance is reduced and a lower wall of the load-carrying rail is clamped against the foot member support.

14. The load-carrier according to claim 1, wherein the support on the foot member carrying the rail is arranged to deflect along a vertical plane passing through the rail when the rail is clamped to the foot member.

15. The load-carrier according to claim 14, wherein the foot member further comprises: a pressed sheet metal foot member and a tongue formed from the support of the foot member and which is pressed from a foot member web and is directed towards a vehicle roof center, said tongue arranged to perform restricted vertical deflection movements.

16. The load-carrier according to claim 1, wherein the clamping element further comprises: a resilient finger which is vertically compressible; the resilient finger having a first point of abutment located at a force-transfer means associated with the actuating member on the foot member so that at the first point of abutment the resilient finger extends in a direction outwards and away from the vehicle center and a second point of abutment located at an abutment tongue which tends to press the foot member in a direction towards the vehicle center relative to the load-carrying rail owning to a tendency to expand horizontally.

17. The load-carrier according to claim 16, wherein the resilient finger further comprises: an arch-shaped curve having an inner curve and an outer curve; the inner curve of the arch facing away from the inner face of the load-carrying rail so that the force transfer means acts on the inner curve of the resilient finger for the purpose of providing transverse compression relative to the load-carrying rail and longitudinal expansion by straightening the arch of the resilient finger.

18. The load-carrier according to claim 16, wherein the resilient finger further comprises: a first end portion positioned externally of the abutment point of the force transfer means so that the end portion of the resilient finger abuts against the inner face of the load-carrying rail with a high frictional force and a second end portion of the resilient finger arranged to move relative to the inner face of the load-carrying rail along the load-carrying rail and to abut against an abutment portion associated with the foot member.

19. The load-carrier according to claim 18, wherein the abutment portion further comprises: a tongue projecting through a slit formed in the inner face of the load-carrying rail which comes into contact with an abutment face of the resilient finger.

20. The load-carrier according to claim 18, wherein the force transfer means further comprises a depending traction link.

* * * * *